United States Patent
Kwon

[19]

[11] Patent Number: 5,903,561
[45] Date of Patent: May 11, 1999

[54] METHOD AND APPARATUS FOR COMMUNICATION NODE ADDRESS INITIALIZATION BY USING NVSRAM

[75] Inventor: Hwan-Woo Kwon, Seoul, Rep. of Korea

[73] Assignee: Daewoo Telecom, Ltd., Incheon, Rep. of Korea

[21] Appl. No.: 08/935,643

[22] Filed: Sep. 23, 1997

[30] Foreign Application Priority Data

Dec. 10, 1996 [KR] Rep. of Korea ...................... 96-63871

[51] Int. Cl.$^6$ .................................................. H04L 12/403
[52] U.S. Cl. ...................... 370/382; 395/200.52; 370/453
[58] Field of Search .................................. 370/254, 400,
370/408, 453, 389, 382, 457; 395/200.5,
200.51, 200.52; 364/132, 222.2, 228.3,
229

[56] References Cited

U.S. PATENT DOCUMENTS

| | | | |
|---|---|---|---|
| 4,335,426 | 6/1982 | Maxwell | 395/200.52 |
| 5,386,466 | 1/1995 | Bales | 370/256 |
| 5,465,251 | 11/1995 | Judd | 370/254 |
| 5,729,686 | 3/1998 | Heck | 395/200.52 |

*Primary Examiner*—Ajit Patel
*Assistant Examiner*—R. Pizarro
*Attorney, Agent, or Firm*—Pennie & Edmonds LLP

[57] ABSTRACT

A method of initializing a set of node addresses by using an apparatus having a CPU, a ROM and a NVSRAM for use in an electronic switching system comprises the steps of: (a) checking if there is a request to change the set of node addresses; (b) updating the NVSRAM with a new set of node addresses, and then going to step (f) if there is the request at the step (a); (c) checking if a flag in the NVSRAM is set or not when there is no request at the step (a); (d) going to the step (f) if the flag in the NVSRAM is determined to be set at the step (c); (e) copying the node addresses stored in the ROM to the NVSRAM if the flag in the NVSRAM is determined not to be set at the step (c); and (f) copying the set of node addresses stored in the NVSRAM onto the corresponding nodes.

6 Claims, 3 Drawing Sheets

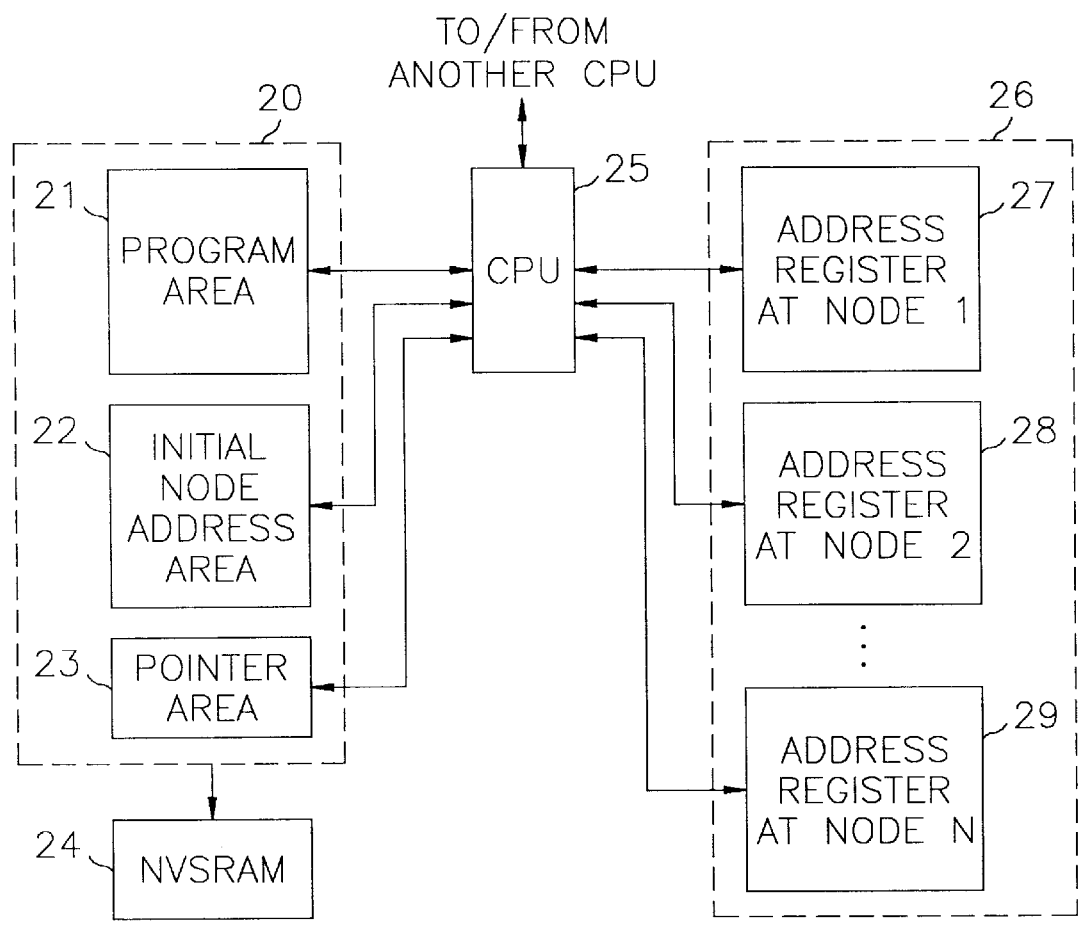

METHOD AND APPARATUS FOR COMMUNICATION NODE ADDRESS INITIALIZATION BY USING NVSRAM

FIELD OF THE INVENTION

The present invention relates to an electronic switching system; and, more particularly, to a flexible node address initialization method for use in an inter-processor communications system.

BACKGROUND OF THE INVENTION

A distributed control architecture is a state-of-the-art control architecture for use in an ESS(Electronic Switching System), wherein a number of processors performing a variety of functions are involved and practical and useful cooperations between the processors are achieved by using a so-called IPC(Inter-Processor Communications) network.

For an efficient inter-processor communications system based on the IPC network, there are employed nodes at some intermediate points of the IPC network in order to route and arbitrate a data flow between the processors. To each of the nodes, an independent and unique node address is assigned. Whenever the ESS is turned on, an initialization of the node address is required: that is, the assigned address must be stored at an address register residing therein upon turning on the ESS.

In FIG. 1, there is illustrated a conventional node address initialization apparatus which is capable of initializing a single node address. In FIG. 1, the conventional node address initialization apparatus comprises a set of jumper straps 10 and a buffer 11, wherein the number of the jumper straps depends on the word size of the node address and the buffer is connected to the address register residing in each node. One side of each jumper strap is grounded and the other side thereof is connected to the buffer and a voltage source Vcc of, e.g., 5 V, via a pull-up resistor.

If the jumper strap is bridged, 0 V or a logic "0" is inputted to the buffer; otherwise, 5 V or a logic "1" is inputted to the buffer. If the ESS is turned on, a node address word formed by manipulating the jumper straps is stored in the buffer. Then, the node address in the buffer is transferred to the address register 12 at the node. Since the conventional node address initialization apparatus shown in FIG. 1 can initialize only a single node, there are needed as many node address initialization apparatus as the number of nodes involved therein to accomplish the initialization process, thereby making the apparatus complex and costly.

There are other drawbacks in the conventional node address initialization apparatus: for instance, the node address must be manually and individually assigned to every node involved; and, it is difficult to realize a high integrity node board due to the non-electronic nature of the jumper straps; and, furthermore, an alteration of the node addresses cannot be performed while the ESS is in operation.

SUMMARY OF THE INVENTION

It is, therefore, a primary object of the present invention to provide a method and an apparatus for realizing an easy and flexible node address initialization, and, in addition, a node board with a rather high degree of integrity.

In accordance with the present invention, there is provided a method of initializing node addresses for use in an inter-processor communications system within an electronic switching system having a processor connected to a ROM (Read-Only Memory) and a NVSRAM(Non-Volatile Static Random Access Memory) and to a plurality of nodes, each node having a register storing a node address assigned thereto, wherein the inter-processor communications system employs a plurality of inter-processor communications configurations, and a set of node addresses is assigned to each inter-processor communications configuration, the method comprising the steps of: (a) checking if there is a request to change the set of node addresses assigned to an inter-processor communications configuration; (b) updating the NVSRAM with a new set of node addresses, and then going to step (f) if there is the request at the step (a); (c) checking whether or not a flag in the NVSRAM is set when there is no request at the step (a), wherein the flag represents the data stored in the NVSRAM indicating whether or not a set of node addresses has been written in the NVSRAM; (d) going to the step (f) if the flag in the NVSRAM is determined to be set at the step (c); (e) copying the node addresses stored in the ROM onto the NVSRAM if the flag in the NVSRAM is determined not to be set at the step (c); and (f) copying the set of node addresses stored in the NVSRAM onto corresponding nodes.

BRIEF DESCRIPTION OF THE DRAWINGS

The above and other objects and features of the present invention will become apparent from the following description of preferred embodiments given with reference to the accompanying drawings, in which:

FIG. 2 describes an inventive node address initialization apparatus;

FIG. 3 shows an exemplary make-up of node address sets and a pointer stored in the initial node address area and the pointer area, respectively, shown in FIG. 2.

DETAILED DESCRIPTION OF THE PREFERRED EMBODIMENT

Figure 1:
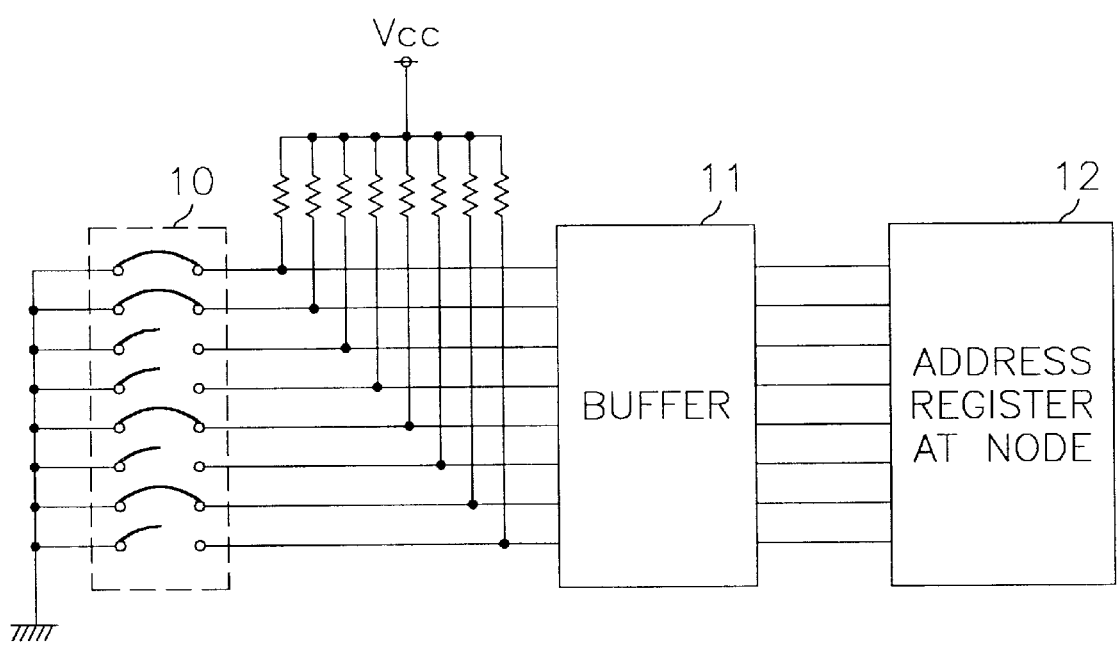
FIG. 1 depicts a conventional node address initialization apparatus.

Referring to FIG. 2, there is illustrated a make-up of an apparatus capable of accommodating a node address initialization method in accordance with the present invention. The apparatus comprises a ROM(Read-Only Memory) 20, a NVSRAM(Non-Volatile Static Random Access Memory) 24, and a CPU(Central Processing Unit) 25.

The pair of the ROM 20 and the CPU 25 employed therein are one out of typical pairs of a ROM and a CPU in an ESS, wherein the CPU 25 is capable of performing functions related with the inventive node address initialization method in addition to the functions inherently performed in the typical ESS and the ROM 20 has additional areas, an initial node address area 22 and a pointer area 23 to store node addresses and a pointer, respectively. The burden to the ROM 20 and the CPU 25 for performing additional functions related to the inventive node address initialization method is minute as compared with the load for performing the inherent functions thereof, thereby causing no additional problems therewith. However, if there occurs any problem with the pair of the ROM 20 and a CPU 25, then a new pair of a CPU and a ROM can be employed.

A memory field of the ROM 20 is parceled out into three areas: a program area 21, the initial node address area 22, and the pointer area 23.

The program area 21 is intended to store programs executed by the CPU 25. The node address area 22 refers to a memory field assigned for storing a set of initial node addresses, the initial node address referring to a node address that is to be written onto a register of a node employed in an IPC configuration determined as of the foremost turn-on of the ESS. The pointer area 23 is for storing a pointer, wherein the pointer represents a start address of the set of initial node addresses stored in the initial node address area 22.

On the other hand, the NVSRAM 24 is a memory device additionally employed for the inventive apparatus, wherein the NVSRAM is the same as a typical SRAM(Static Random Access Memory) except that the NVSRAM sustains data therein in spite of power-out. The NVSRAM is intended to store a flag and a latest set of node addresses, wherein the flag is a bit of data indicating whether or not a set of node addresses has been written in the NVSRAM 24, and the latest set of node addresses refers to a set of node addresses in which a most recent alteration is included.

The NVSRAM is updated with the most recently altered set of node addresses while the initial node address area 22 maintains a set of node addresses stored at the time of the foremost turn-on of the ESS.

Each register in a register unit 26 refers to a register in every node employed in a specific configuration of the IPC. Each of the registers holds an address assigned thereto.

FIG. 3 illustrates an exemplary arrangement of a node address set stored in the node address area 22 and a pointer stored in the pointer area 23. For the purpose of illustration, there is assumed to be two, a first and a second, sets of node addresses: the first is the one initially established in the initial node address area 22; and the second is the one assumed to be replaced with in the course of the operation of the first set of node addresses. The number of nodes employed in the two sets is four, respectively.

The first set of node addresses consists of $(00)_{16}$, $(01)_{16}$, $(02)_{16}$, $(03)_{16}$; and the second set of node addresses consists of $(06)_{16}$, $(07)_{16}$, $(08)_{16}$, $(09)_{16}$. The exemplary addresses of the first set of node addresses, or the stored places, are $(1000)_{16}$ through $(1003)_{16}$, respectively. The second set of node addresses will be stored in the NVSRAM 24 when the inventive apparatus receives an instruction from another CPU that the set of node addresses be altered.

The address of the pointer $(1000)_{16}$ stored in the pointer area 23 is $(1F00)_{16}$. The pointer $(1000)_{16}$ corresponds to the initial address of the set of node addresses stored in the initial node address area 22.

Figure 4:
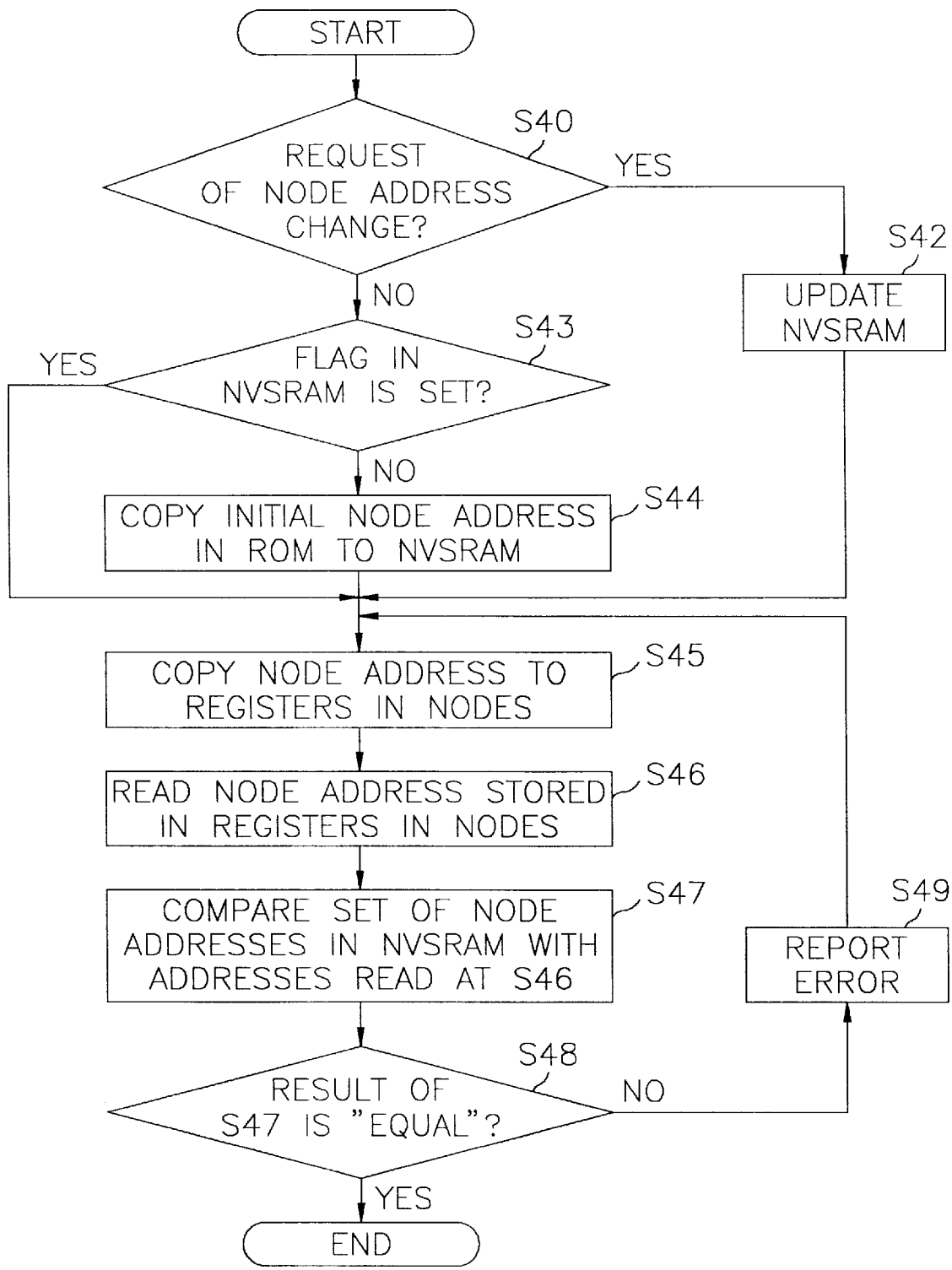
FIG. 4 illustrates a flow diagram of a node address initialization method in accordance with the present invention.

The node address initialization method in accordance with the present invention will be described hereinafter with reference to FIGS. 2 to 4.

When the ESS is turned on, the CPU 25 checks if there is a request from another CPU(not shown) to change the set of node addresses at step S40. If there is, at step S42, the CPU 25 updates the NVSRAM 24 with a new set of node addresses received from the other CPU, e.g., the second set of node addresses consisting of $(06)_{16}$, $(07)_{16}$, $(08)_{16}$ and $(09)_{16}$ is stored in the NVSRAM 24. Then the inventive procedure goes to step S45. The updating at step S42 is done regardless of the state of the flag.

If there is no request checked at the step S40, the CPU 25 checks whether the flag in the NVSRAM 24 is set at step S43 or not. If the flag in the NVSRAM 24 is determined to be set, which means that a set of node addresses is stored in the NVSRAM 24, the procedure goes to step S45; and if otherwise, the initial node addresses $(00)_{16}$, $(01)_{16}$, $(02)_{16}$, $(03)_{16}$ stored in the initial node address area 22 are copied to the NVSRAM 24 at step S44 since no set of data is stored in the NVSRAM 24. At step S45, the node addresses stored in the NVSRAM 24 are copied to corresponding nodes, respectively.

The CPU, at step S46, reads the node addresses copied at step S45 from each node. At step S47, the CPU compares the node addresses read at step S46 with the node addresses stored in the NVSRAM 24, in order to verify the copying at step S45. If the comparison at step S47 is determined to be "equal" at step S48, which suggests the copying at step S45 is duly performed, the procedure ends. And if otherwise, which suggests the copying is not duly performed, an error is reported at step S49 and the procedure goes back to step S45. Steps S45 to S48 are iterated until the copying is determined to be duly completed.

From the description above, it is apparent that the novel method and apparatus are superior to the conventional ones: for instance, the node address can be automatically assigned to nodes involved; and, it is easy to realize a high integrity node board since the inventive apparatus is made up of electronic components; and, furthermore, an alteration of the node addresses can be performed while the ESS is operating.

While the present invention has been described with respect to the preferred embodiments, other modifications and variations may be made without departing from the scope and spirit of the present invention as set forth in the following claims.

What is claimed is:

1. A method of initializing node addresses for use in an inter-processor communications system within an electronic switching system having a processor connected to a ROM (Read-Only Memory) and a NVSRAM (Non-Volatile Static Random Access Memory) and to a plurality of nodes, each node having a register storing a node address assigned thereto, wherein the inter-processor communications system employs a plurality of inter-processor communications configurations, and a set of node addresses is assigned to each inter-processor communications configuration, the method comprising the steps of:

(a) checking if there is a request to change a current set of node addresses assigned to a current inter-processor communications configuration;

(b) updating the NVSRAM with a new set of node addresses, and then going to step (f) if there is the request at the step (a);

(c) checking whether or not a flag in the NVSRAM is set when there is no request at the step (a), wherein the flag represents data stored in the NVSRAM indicating that the current set of node addresses is stored in the NVSRAM;

(d) going to the step (f) if the flag in the NVSRAM is determined to be set at the step (c);

(e) copying an initial set of node addresses stored in the ROM onto the NVSRAM if the flag in the NVSRAM is determined not to be set at the step (c); and (f) copying the set of node addresses stored in the NVSRAM onto corresponding nodes.

2. The method of claim 1, wherein the method further comprises the steps of:

(g) reading each of the node addresses copied at the step (f) from each node;

(h) comparing the node addresses read at the step (g) with the node addresses stored in the NVSRAM, to thereby verify the copying done at the step (f);

(i) ending the procedure if the comparison at the step (h) is determined to be "equal"; and (j) going back to the step (f) if the comparison at the step (h) is determined not to be "equal".

3. A node address initialization apparatus for use in an inter-processor communications system within an electronic switching system, comprising:

a first storing means for storing a pointer and a set of node addresses, wherein the set of node addresses corresponds to node addresses employed in an initial inter-processor communications configuration, and the pointer specifies a first address of the set of node addresses employed in the initial inter-processor communications configuration;

a second storing means for storing a latest-updated set of node addresses;

a control means connected to the first and the second storing means and a plurality of nodes for controlling the first and the second storing means by copying the set of node addresses stored in the first storing means to the second storing means, checking if there is a request to change the set of node addresses and if the second storing means is written, writing each node address in the second storing means onto each corresponding node and verifying whether the addresses written in the nodes are equal to the node addresses in the second storing means.

4. The apparatus of claim 3, wherein the first storing means is an erasable programmable read-only memory.

5. An electronic switching system having an inter-processor communications system and a node address initialization apparatus therein, characterized in that the initialization apparatus comprises:

a first storing means for storing a pointer and a set of node addresses, wherein the set of node addresses corresponds to node addresses employed in an initial inter-processor communications configuration, and the pointer specifies a first address of the set of node addresses employed in an initial inter-processor communications configuration;

a second storing means for storing a latest-updated set of node addresses;

a control means connected to the first and the second storing means and a plurality of nodes for controlling the first and the second storing means by copying the set of node addresses stored in the first storing means to the second storing means, checking if there is a request to change the set of node addresses and if the second storing means is written, writing each node address in the second storing means onto each corresponding node and verifying whether the addresses written in the nodes are equal to the node addresses in the second storing means.

6. The electronic switching system of claim 5, wherein the first storing means is an erasable programmable read-only memory.

* * * * *